US012779639B2

(12) United States Patent
Nakamura et al.

(10) Patent No.: US 12,779,639 B2
(45) Date of Patent: Nov. 3, 2026

(54) IMPACT TOOL, IMPACT TOOL MANAGEMENT SYSTEM, IMPACT TOOL MANAGEMENT METHOD, AND RECORDING MEDIUM

(71) Applicants: SUBARU CORPORATION, Tokyo (JP); Panasonic Electric Works Co., Ltd., Osaka (JP)

(72) Inventors: Atsushi Nakamura, Osaka (JP); Shinji Seko, Mie (JP); Takafumi Morimoto, Mie (JP); Yuya Okada, Saitama (JP); Tomoya Nakanishi, Saitama (JP)

(73) Assignees: SUBARU CORPORATION, Tokyo (JP); PANASONIC ELECTRIC WORKS CO., LTD., Osaka (JP)

(*) Notice: Subject to any disclaimer, the term of this patent is extended or adjusted under 35 U.S.C. 154(b) by 0 days.

(21) Appl. No.: 19/259,715

(22) Filed: Jul. 3, 2025

(65) Prior Publication Data

US 2026/0034648 A1 Feb. 5, 2026

(30) Foreign Application Priority Data

Jul. 31, 2024 (JP) ................................ 2024-124399

(51) Int. Cl.
*B25B 23/147* (2006.01)

(52) U.S. Cl.
CPC ................................ *B25B 23/1475* (2013.01)

(58) Field of Classification Search
CPC ... B25B 23/1475; B25B 21/02; B25B 21/026; B25B 23/14; B25B 23/147; B25B 23/1405; B25B 23/1453
See application file for complete search history.

(56) References Cited

U.S. PATENT DOCUMENTS

| | | | | |
|---|---|---|---|---|
| 2010/0252287 | A1 | 10/2010 | Morimura et al. | |
| 2017/0173768 | A1* | 6/2017 | Dey, IV | B25B 21/02 |
| 2024/0367296 | A1 | 11/2024 | Nakamura et al. | |

FOREIGN PATENT DOCUMENTS

| | | | |
|---|---|---|---|
| JP | 5234287 | B2 | 7/2013 |
| JP | 5390226 | B2 | 1/2014 |
| JP | 2022-187923 | A | 12/2022 |

* cited by examiner

*Primary Examiner* — Veronica Martin
(74) *Attorney, Agent, or Firm* — Rimon P.C.

(57) ABSTRACT

An impact tool includes: a measurer that measures a hammer advance angle per strike for a target part; a determiner that uses a predetermined reference database including a threshold to determine whether the hammer advance angle measured by the measurer is an angle corresponding to normal fastening or an angle corresponding to anomalous fastening based on the threshold; and a presenter that presents information indicating anomalous fastening when the determiner determines that anomalous fastening has been applied.

9 Claims, 14 Drawing Sheets

FIG. 11

| Tool used | Calibration date of tool used | Operator name | Operation time | Set torque (Nm) | Specified torque range (Nm) | Fastening torque (Nm) | Feature amount | Threshold | Fastening condition |
|---|---|---|---|---|---|---|---|---|---|
| AAAA | 2024/5/7 | A | 11:00 | 5.0 | 4.8 ~ 5.2 | 5.0 | 20 | 75 | Normal fastening |
| AAAA | 2024/5/7 | A | 11:05 | 5.0 | 4.8 ~ 5.2 | 3.5 | 18 | 75 | Anomalous fastening |
| AAAA | 2024/5/7 | A | 11:13 | 5.0 | 4.8 ~ 5.2 | 5.0 | 85 | 75 | Anomalous fastening |
| • • • | • • • | • • • | • • • | • • • | • • • | • • • | • • • | • • • | • • • |

IMPACT TOOL, IMPACT TOOL MANAGEMENT SYSTEM, IMPACT TOOL MANAGEMENT METHOD, AND RECORDING MEDIUM

CROSS REFERENCE TO RELATED APPLICATION

This application claims the benefit of priority of Japanese Patent Application Number 2024-124399, filed on Jul. 31, 2024, the entire content of which is hereby incorporated by reference.

TECHNICAL FIELD

The present disclosure relates to an impact tool and the like.

BACKGROUND ART

Japanese Unexamined Patent Application Publication No. 2022-187923 (Patent Literature (PTL) 1) discloses a tool system that can improve the accuracy of determining the fastening state of a fastening part based on standard information that serves as a reference for determining the fastening state of a fastening part and actual measured feature amounts obtained when the tool actually fastens the fastening part.

SUMMARY

The tool system described in PTL 1 determines whether a predetermined torque amount has been applied to the fastening part (the target part), but this determination may not be able to determine whether the target part is fastened in the correct direction. That is, this tool system may incorrectly determine that the target part is correctly fastened, even if the target part is not properly fastened.

One aspect of the present invention provides an impact tool and the like that can improve the accuracy of determining the fastening state of a target part.

An impact tool according to one aspect of the present invention includes: a measurer that measures a hammer advance angle per strike for a target part; a determiner that uses a predetermined reference database including a threshold to determine whether the hammer advance angle measured by the measurer is an angle corresponding to normal fastening or an angle corresponding to anomalous fastening based on the threshold; and a presenter that presents information indicating anomalous fastening when the determiner determines that anomalous fastening has been applied.

An impact tool management system according to one aspect of the present invention includes: the impact tool described above; and a management device that manages information indicating the determining by the determiner included in the impact tool.

An impact tool management method according to one aspect of the present invention includes: measuring a hammer advance angle per strike for a target part; determining, by using a predetermined reference database including a threshold, whether the hammer advance angle measured by the measuring is an angle corresponding to normal fastening or an angle corresponding to anomalous fastening based on the threshold; and presenting information indicating anomalous fastening when it is determined in the determining that anomalous fastening has been applied.

A recording medium according to one aspect of the present invention is a non-transitory computer-readable recording medium having recorded thereon a program for causing a computer to execute the impact tool management method described above.

The impact tool and the like of one aspect of the present invention can improve the accuracy of determining the fastening state of the target part.

BRIEF DESCRIPTION OF THE DRAWINGS

The figures depict one or more implementations in accordance with the present teaching, by way of examples only, not by way of limitations. In the figures, like reference numerals refer to the same or similar elements.

FIG. 11 is a diagram showing an example of the determination result displayed in step S112 shown in FIG. 6.

DETAILED DESCRIPTION

Figure 1:
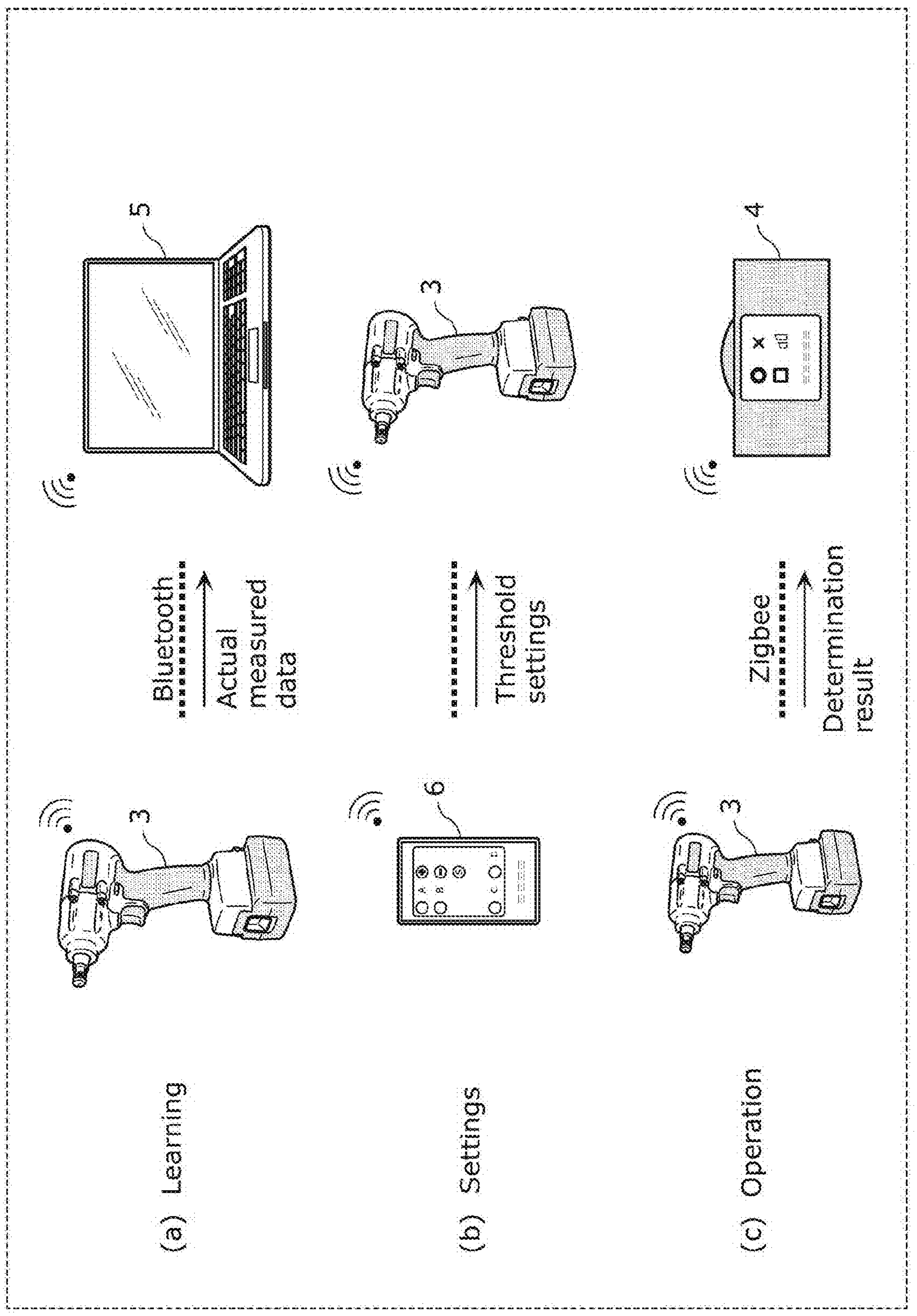
FIG. 1 is a schematic diagram of an impact tool management system according to the present embodiment.

Hereinafter, embodiments will be described in detail with reference to the drawings. It should be noted that each of the embodiments described below shows a comprehensive or specific example. The numerical values, shapes, materials, components, arrangement positions and connection forms of the components, steps, order of steps and the like shown in the following embodiments are merely examples and are not intended to limit the present invention. In addition, among the components in the following embodiments, the components not described in the independent claims are described as arbitrary components.

It should be noted that each figure is a schematic view and is not necessarily exactly illustrated. In addition, in each figure, the same reference numerals are assigned to substantially the same feature, and overlapping descriptions may be omitted or simplified.

Embodiment

First, the impact tool management system of the present disclosure will be described with reference to FIG. 1. FIG. 1 is a schematic diagram of a management system for impact tool 3 according to the present embodiment. The management system shown in FIG. 1 is a system for target objects that require a predetermined fastening by a target part (for example, a fastening part), and is a system including impact tool 3, management device 4, terminal device 5, and remote controller 6. It should be noted that (a) in FIG. 1 is a schematic diagram showing a scene in which impact tool 3 transmits actual measured data relating to fastening of the target part to terminal device 5 (that is, a scene at the time of learning). (b) in FIG. 1 is a schematic diagram showing a scene in which remote controller 6 transmits a reference database having a threshold to impact tool 3, and sets a threshold to impact tool 3 (that is, a scene at the time of setting). It should be noted that in (b) in FIG. 1, the reference database having the threshold transmitted by remote controller 6 includes the threshold calculated by terminal device 5 shown in (a) in FIG. 1. (c) in FIG. 1 is a schematic diagram showing a scene in which impact tool 3 transmits the determination result to management device 4 (that is, the scene at the time of operation). The determination result transmitted by impact tool 3 in (c) in FIG. 1 is the result determined by impact tool 3 using the threshold set in (b) in FIG. 1.

As shown in (a) in FIG. 1, the actual measured data obtained by impact tool 3 is transmitted to terminal device 5. Based on the received actual measured data, terminal device 5 visualizes the threshold used for impact tool 3 determining whether the fastening of the target part is normal (whether a predetermined torque amount has been applied to the target part, and whether the target part has been fastened in the correct direction). It should be noted that the actual measured data is data relating to fastening of the target part. In addition, communication between impact tool 3 and terminal device 5 is realized by, for example, wireless communication such as Bluetooth (registered trademark), but is not limited thereto.

As shown in (b) in FIG. 1, remote controller 6 transmits a reference database with a threshold to impact tool 3, and sets a threshold to impact tool 3. Accordingly, when performing the fastening operation, impact tool 3 uses the threshold to determine whether the fastening of the target part is normal. It should be noted that communication between impact tool 3 and terminal device 5 is realized by, for example, wireless communication such as infrared communication, but is not limited thereto.

As shown in (c) in FIG. 1, impact tool 3 transmits the determination result to management device 4. Management device 4 manages the received determination results. It should be noted that communication between impact tool 3 and management device 4 is realized by, for example, wireless communication such as Zigbee (registered trademark), but is not limited thereto.

Figure 2:
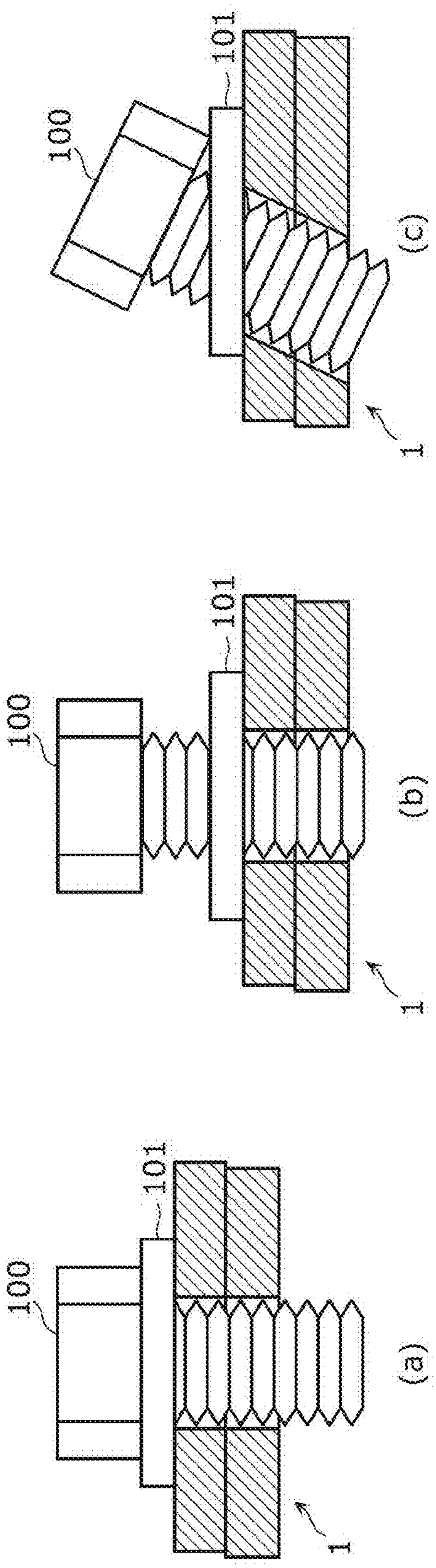
FIG. 2 is a schematic diagram showing the fastening state of the target part.

Next, in this specification, explanations are provided using specific examples of a case where the tightening of the target part is normal and a case where the tightening of the target part is anomalous. FIG. 2 is a schematic diagram showing the fastening state of the target part. It should be noted that FIG. 2 is a schematic diagram showing the fastening state of the target part when target object 1 is fastened using bolt 100 and washer 101 on the target part. In addition, in FIG. 2, the target part inserted into target object 1 is shown as visible so that the state of tightening by the target part can be easily understood. In addition, in FIG. 2, the screw hole of target object 1 is provided in the direction perpendicular to the plane. (a) in FIG. 2 is a schematic diagram in the case where the fastening of the target part is normal. (b) in FIG. 2 and (c) in FIG. 2 are schematic diagrams in the case where the fastening of the fastening part is anomalous.

As shown in (a) in FIG. 2, bolt 100 is fastened in the direction of the screw hole, and the entire seat surface of bolt 100 is in contact with washer 101. In this specification, a fastening state that satisfies the above two is referred to as normal fastening.

As shown in (b) in FIG. 2, bolt 100 is fastened in the direction of the screw hole, but the seat surface of bolt 100 is not in contact with washer 101. In this specification, the fastening state shown in (b) in FIG. 2 is referred to as anomalous fastening.

As shown in (c) in FIG. 2, bolt 100 is fastened obliquely with respect to the direction of the screw hole, and a part of the seat surface of bolt 100 is in contact with washer 101. In this specification, the fastening state shown in (c) in FIG. 2 is referred to as anomalous fastening, similar to the fastening state shown in (b) in FIG. 2. In addition, the fastening state shown in (c) in FIG. 2 is referred to as a cross-threaded.

[Configuration]

Figure 3:
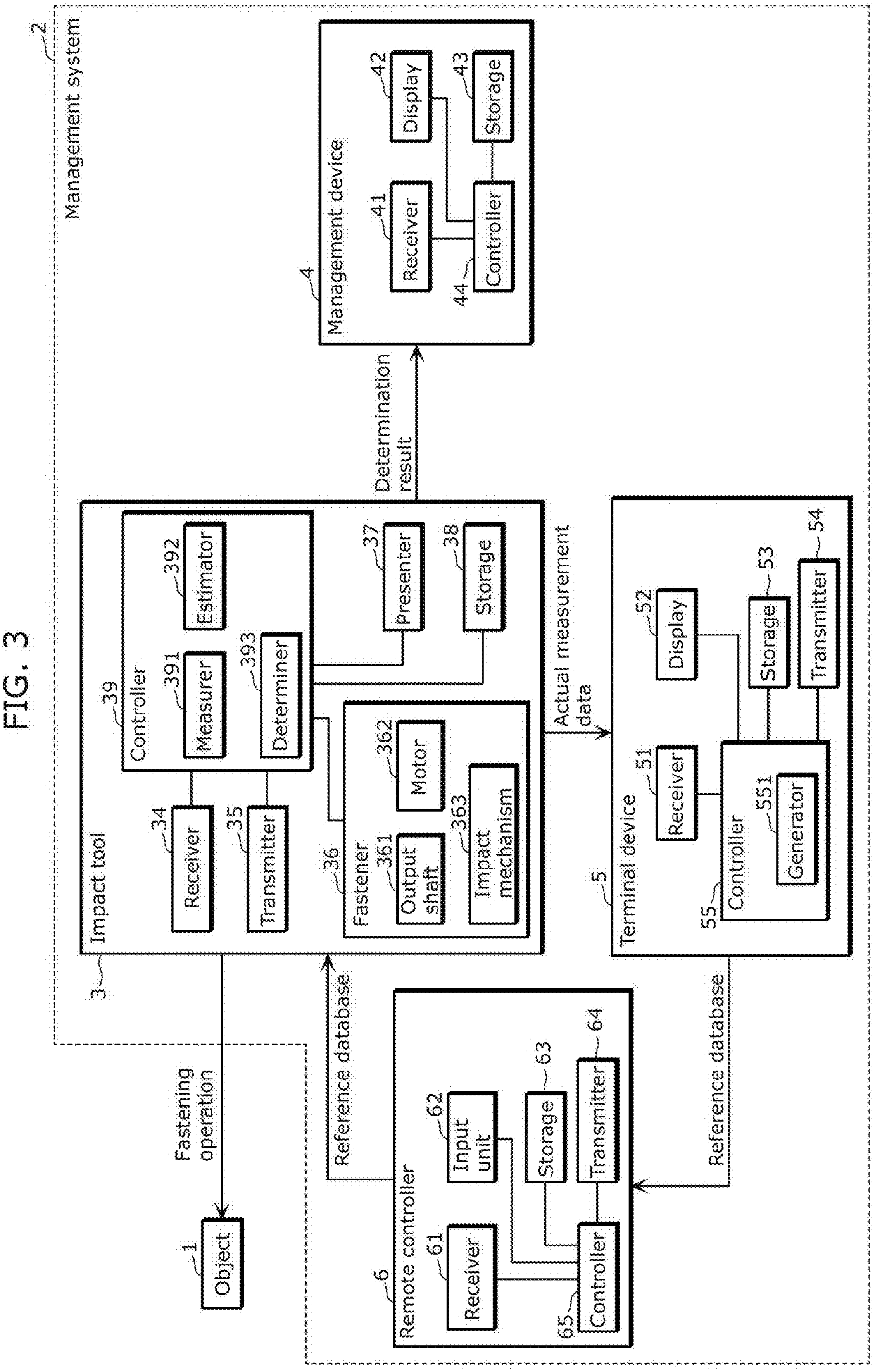
FIG. 3 is a block diagram showing the functional configuration of an impact tool management system according to the embodiment.

Hereinafter, the configuration of management system 2 for impact tool 3 according to the embodiment will be described. FIG. 3 is a block diagram showing the functional configuration of management system 2 for impact tool 3 according to the embodiment. The present disclosure includes target object 1 and management system 2.

Target object 1 requires a predetermined fastening by the target part, and may be, for example, a vehicle, an aircraft, or the like. In addition, the target part is, for example, a fastening part such as a screw, a bolt, or a nut.

Management system 2 is a system for target object 1 that requires predetermined fastening by the target part.

Management system 2 includes impact tool 3, management device 4, terminal device 5, and remote controller 6.

Figure 4:
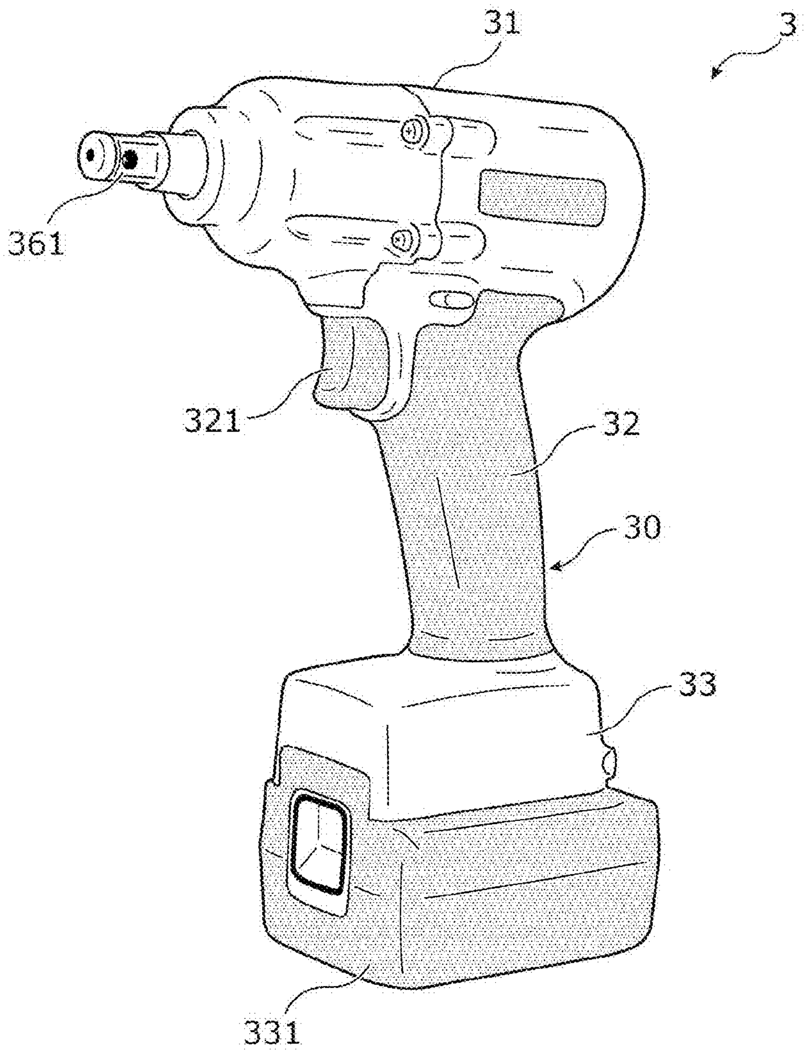
FIG. 4 is an external view of the impact tool.

Impact tool 3 is a tool that fastens the target part to target object 1, and is, for example, an impact driver or the like. Impact tool 3 will be described with reference to FIG. 4. FIG. 4 is an external view of impact tool 3.

As shown in FIG. 4, impact tool 3 includes body 30. In addition, body 30 includes body portion 31, grip portion 32, and mounting portion 33.

Body portion 31 is formed in a cylindrical shape. Grip portion 32 protrudes in one direction from a part of the circumferential surface of body portion 31. Mounting portion 33 is formed in a flat rectangular parallelepiped shape. In addition, body portion 31 and mounting portion 33 are connected to each other by grip portion 32.

Body portion 31 houses at least some components of fastener 36 shown in FIG. 3. Output shaft 361, which is a component of fastener 36, protrudes from one end surface of body portion 31 in the axial direction.

Grip portion 32 is a part that the operator grips when the fastening part is fastened using impact tool 3. In addition, grip portion 32 is provided with trigger switch 321 for the operator to operate impact tool 3. Trigger switch 321 is a switch for controlling the on/off of the operation of fastener 36. Trigger switch 321 includes an initial position and an ON position, and fastener 36 is operated when trigger switch 321 is pushed or pulled to the ON position by the operator. In addition, the number of rotations of fastener 36 can be adjusted in accordance with the pulling amount (operation amount).

Removable battery 331 is mounted to mounting portion 33 on one side opposite the side that connects to grip portion 32. It should be noted that battery 331 is achieved as, for example, a lithium-ion battery or the like, and supplies power to each of the components included in impact tool 3 shown in FIG. 3.

Returning to the description in FIG. 3, impact tool 3 includes receiver 34, transmitter 35, fastener 36, presenter 37, storage 38, and controller 39.

Receiver 34 is a communication circuit for impact tool 3 to communicate with the external device (in FIG. 3, remote controller 6). Receiver 34 receives a reference database having a threshold transmitted by transmitter 64 of remote controller 6.

Transmitter 35 is a communication circuit for impact tool 3 to communicate with management device 4. Transmitter 35 transmits the determination result generated by determiner 393 of controller 39, which will be described later, to management device 4. In addition, transmitter 35 is a communication circuit for impact tool 3 to communicate with terminal device 5. Transmitter 35 transmits the actual measured data generated by controller 39 to terminal device 5.

Fastener 36 includes output shaft 361, motor 362, impact mechanism 363, a reduction mechanism (not shown), a drive shaft (not shown), a socket (not shown), an encoder (not shown), and the like. Fastener 36 rotates the socket (i.e., the tip tool) with power from motor 362 to fasten the target part.

The reduction mechanism included in fastener 36 transmits the rotational force of the rotational shaft of motor 362 to the drive shaft. The reduction mechanism is, for example, a planetary gear mechanism, which converts the rotational speed and torque of the rotational shaft of motor 362 into the rotational speed and torque required for the fastening operation. The rotation of the drive shaft is output from output shaft 361 and is transmitted to the socket. Output shaft 361 rotates about a rotation axis in its protruding direction. That is, fastener 36 drives output shaft 361 to rotate output shaft 361 about the rotation axis.

The cylindrical socket for rotating the target part (for example, a bolt, a nut, or the like) is removably attached to output shaft 361. The socket rotates along with output shaft 361 about the rotation axis. The size of the socket attached to output shaft 361 is appropriately selected by the operator to match the size of the target part. With such a configuration, when fastener 36 operates, output shaft 361 rotates, and the socket rotates together with output shaft 361. At this time, when the socket is fitted to the target part, the target part rotates together with the socket, and impact tool 3 realizes fastening of the target part.

In addition, a socket anvil can be attached to output shaft 361 instead of the socket. In such a case, a bit (for example, a driver bit, a drill bit, or the like) can be mounted to impact tool 3 via the socket anvil.

Impact mechanism 363 is driven by the power of motor 362. Impact mechanism 363 includes, for example, a hammer rotatably supported by a drive shaft, an anvil (striker) provided at the rear end of output shaft 361, and the like. The hammer strikes the anvil according to the rotation of the drive shaft. In addition, the hammer includes two claws on the surface that contacts the anvil, and the anvil includes two claws on the surface that contacts the hammer. When the hammer strikes the anvil, the impact is given in the rotational direction by the hooking contact of the respective claws of the hammer and anvil. It should be noted that the two claws of the hammer and the anvil are provided at intervals of 180°, and the hammer strikes the anvil with every half rotation.

When the torque amount applied to the target part exceeds a predetermined level (for example, the torque amount reaches 80% of the predetermined torque amount required for fastening), impact mechanism 363 gives an impact on output shaft 361 in the direction of rotation. This allows impact tool 3 to provide a larger torque amount to the target part.

It should be noted that in the present embodiment, it is not essential that impact mechanism 363 and the socket are included in the components of fastener 36. Impact mechanism 363 and the socket may not be included in the components of fastener 36.

Presenter 37 presents the determination result generated by determiner 393 of controller 39 to the operator, and is realized, for example, using a light emitting diode (LED) or the like. Presenter 37 is provided, for example, on the end face opposite to the end face where output shaft 361 is provided in body portion 31 of body 30 so that the operator can easily visually check presenter 37 while using impact tool 3.

Storage 38 is a storage device in which a reference database having a threshold and a computer program and the like executed by controller 39 are stored. Storage 38 is realized, for example, by memory or the like.

Controller 39 controls the operation (that is, the fastening operation) of fastener 36. Specifically, controller 39 controls the operations of motor 362, impact mechanism 363, and the like, which are components of fastener 36, so that a predetermined torque amount set in advance is applied to the target part. When the torque amount estimated by estimator 392, which will be described later, reaches a predetermined torque amount, controller 39 stops the operation of motor 362, impact mechanism 363, and the like.

Controller 39 controls the display by presenter 37 in accordance with the determination result generated by determiner 393. For example, if the result of the determination is normal fastening, controller 39 lights presenter 37 green, and if the result of the determination is anomalous fastening, controller 39 lights presenter 37 orange or red. A detailed explanation of the control of presenter 37 carried out by controller 39 will be described later.

Controller 39 is realized, for example, by a microcomputer, a processor, or the like. The functions of controller 39 are realized, for example, by the microcomputer or processor included in controller 39, executing a computer program stored in storage 38.

Controller 39 includes measurer 391, estimator 392, and determiner 393.

Measurer 391 measures the hammer advance angle per strike with respect to the target part. The hammer advance angle per strike is the angle at which the hammer rotates between the time the hammer strikes the anvil once and then the next strike. In addition, the hammer advance angle can be obtained by the following Equation 1. It should be noted that the number of detections of light pulses or the like corresponding to the hammer advance angle by the encoder per strike is obtained from the encoder, which is a component of impact tool 3. In addition, the values of 360 and 100 on the right side are values indicating the setting of motor 362 to rotate 360° when the encoder detects 100 times, and are values that change depending on the configuration of impact tool 3. In addition, the value of 8.29 on the right side is a value indicating the gear ratio between motor 362 and the hammer, and is a value that changes depending on the configuration of impact tool 3.

[Math. 1]

$$\text{(Hammer advance angle per impact)} = \text{(Number of encoder detections per impact)} \times \frac{360}{100} \times \frac{1}{8.29} \qquad \text{(Equation 1)}$$

In addition, measurer 391 measures the striking interval, which is the time interval at which the hammer of impact mechanism 363 strikes the anvil.

Estimator 392 estimates the anvil angle using the hammer advance angle per strike obtained from the striking interval and the hammer advance angle measured by measurer 391. Anvil angle is the angle at which an anvil rotates at the impact per strike by a hammer. In addition, the anvil angle is obtained by the following Equation 2. It should be noted that in Equation 2, the hammer rotates 180° more than the anvil before striking the anvil, so it is subtracted by 180° per strike. In addition, the number of strikes on the right side is the total number of times the hammer has hit the anvil.

[Math. 2]

$$\text{(Anvil angle)} = \int \text{(Hammer advance angle per strike)} - 180^{\circ} \times \text{(Number of strikes)} \qquad \text{(Equation 2)}$$

In addition, estimator 392 generates at least one of the data related to the hammer advance angle per strike or the estimated anvil angle as actual measured data. In addition, the actual measured data may be data that includes the hammer advance angle per strike of impact tool 3 when normal fastening is applied to the target part or the part corresponding to the target part, and the hammer advance angle per strike of impact tool 3 when anomalous fastening is applied. It should be noted that the part corresponding to the target part means, for example, a part that has a symmetrical relationship with the target part and is substantially in the same relationship as the target part, such as a part where fastening is performed using the same target part.

Estimator 392 estimates the torque amount applied to the target part based on the striking interval and the hammer advance angle measured by measurer 391. For example, estimator 392 estimates the torque amount applied to the target part based on the number of strikes of the hammer, the striking interval, and the like.

Using the reference database stored in storage 38, determiner 393 determines from the threshold in the reference database whether the hammer advance angle measured by measurer 391 is an angle corresponding to normal fastening or an angle corresponding to anomalous fastening. Specifically, determiner 393 determines from the threshold whether the anvil angle estimated by estimator 392 is an angle corresponding to normal fastening or an angle corresponding to anomalous fastening. In addition, determiner 393 determines whether the torque amount corresponds to normal fastening or the torque amount corresponds to anomalous fastening, based on the torque amount estimated by estimator 392. In addition, determiner 393 generates a determination result based on the above determination.

Management device 4 is a server device that manages information (that is, the determination result) of the determination by determiner 393 provided in impact tool 3. Management device 4 includes receiver 41, display 42, storage 43, and controller 44.

Receiver 41 is a communication circuit for management device 4 to communicate with impact tool 3. Receiver 41 receives the determination result transmitted by transmitter 35 of impact tool 3.

Display 42 displays the determination result and the like, and is realized, for example, by a liquid crystal display or the like.

Storage 43 is a storage device in which the determination result, computer programs executed by controller 44, and the like are stored. Storage 43 is realized, for example, by memory or the like.

Controller 44 controls entire management device 4. For example, controller 44 is realized by a microcomputer, a processor, or the like. The functions of controller 44 are realized, for example, by the microcomputer or processor included in controller 44, executing the computer program stored in storage 43.

Terminal device 5 is a device that generates a reference database with a threshold using actual measured data transmitted from impact tool 3, and is, for example, an information terminal such as a smartphone, tablet, or computer.

Terminal device 5 includes receiver 51, display 52, storage 53, transmitter 54, and controller 55.

Receiver 51 is a communication circuit for terminal device 5 to communicate with impact tool 3. Receiver 51 receives the actual measured data transmitted by transmitter 35 of impact tool 3.

Display 52 displays actual measured data and the like, and is realized, for example, by a liquid crystal display or the like.

Storage 53 is a storage device in which actual measured data, computer programs executed by controller 55, and the like are stored. Storage 53 is realized, for example, by memory or the like.

Transmitter 54 is a communication circuit for terminal device 5 to communicate with remote controller 6. Transmitter 54 transmits the reference database generated by generator 551 of controller 55, which will be described later, to remote controller 6.

Controller 55 controls entire terminal device 5. For example, controller 55 is realized by a microcomputer, a processor, or the like. The functions of controller 55 are realized, for example, by the microcomputer or processor included in controller 55, executing the computer program stored in storage 53. In addition, controller 55 includes generator 551.

Generator 551 generates a reference database based on the actual measured data. Specifically, generator 551 generates a threshold based on the feature amount calculated from the actual measured data, and generates a reference database having the threshold. In addition, the operator or the like may determine a threshold from the feature amount calculated from the actual measured data, and generator 551 may generate a reference database having the threshold. A detailed description of the feature amount will be described later.

Remote controller 6 is a device that sets a reference database to impact tool 3, and is, for example, a remote controller used by an operator to set a reference database to impact tool 3.

Remote controller 6 includes receiver 61, input unit 62, storage 63, transmitter 64, and controller 65.

Receiver 61 is a communication circuit for remote controller 6 to communicate with terminal device 5. Receiver 61 receives the reference database transmitted by transmitter 54 of terminal device 5.

Input unit 62 accepts input from the operator or the like, and is realized using, for example, a button, a touch panel, or the like.

Storage 63 is a storage device in which the reference database, computer programs executed by controller 65, and the like are stored. Storage 63 is realized, for example, by memory or the like.

Transmitter 64 is a communication circuit for remote controller 6 to communicate with impact tool 3. Transmitter 64 transmits the reference database to impact tool 3. It should be noted that the transmission of the reference database to impact tool 3 by transmitter 64 is sometimes referred to as a threshold setting.

Controller 65 controls entire remote controller 6. For example, controller 65 is realized by a microcomputer, a processor, or the like. The functions of controller 65 are realized, for example, by the microcomputer or processor included in controller 65, executing the computer program stored in storage 63.

It should be noted that instead of transmitting the reference database generated by terminal device 5 to remote controller 6, controller 65 may be realized by an operator or the like manually inputting the reference database displayed on terminal device 5 into remote controller 6.

[Difference in Anvil Angle when Normal and Anomalous Fastening]

Figure 5:
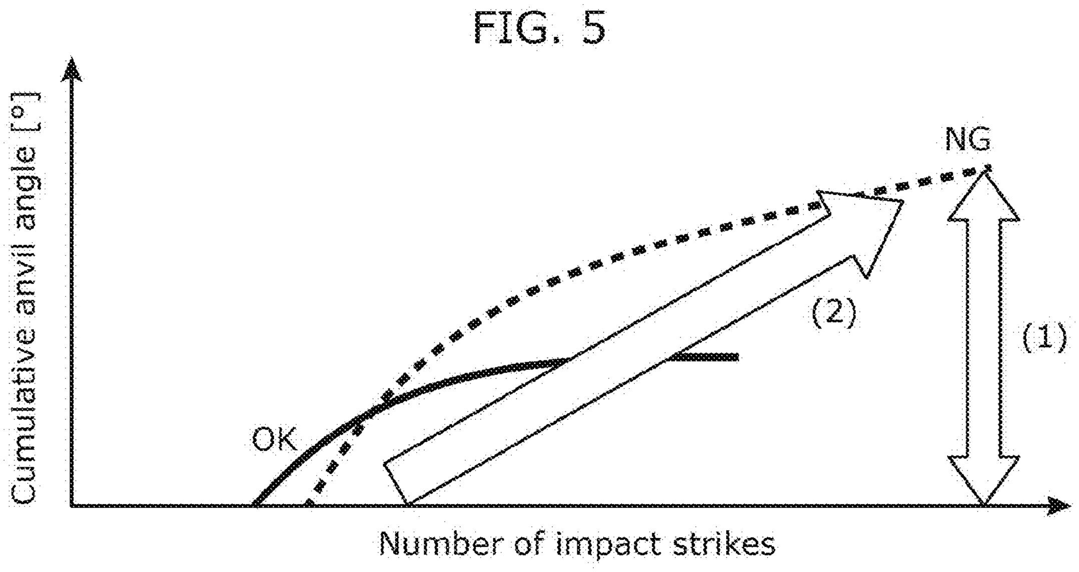
FIG. 5 is a diagram showing the change in the cumulative anvil angle relative to the number of impact strikes.

The difference in anvil angle estimated by estimator 392 when the target part is normally fastened and anomalously fastened, will be explained with reference to FIG. 5. FIG. 5 is a diagram showing the change in the cumulative anvil angle relative to the number of impact strikes. In the graph shown in FIG. 5, the horizontal axis represents the number of impact strikes, and the vertical axis represents the cumulative anvil angle. In addition, the solid line is a line that indicates the change in the cumulative anvil angle during normal fastening, and the dashed line is a line that indicates the change in the cumulative anvil angle during anomalous fastening. It should be noted that the number of impact strikes is the total number of times the hammer of impact mechanism 363 strikes the anvil, and the cumulative anvil angle is the cumulative value of the anvil angle estimated by estimator 392.

As shown in FIG. 5, at normal fastening, when the number of impact strikes exceeds a certain number of times, the cumulative anvil angle hardly changes. On the other hand, at anomalous fastening, the rate of increase in the cumulative anvil angle is not subject to much variation depending on the number of impact strikes. That is, the cumulative anvil angle at anomalous fastening has a value that is greater than a value of the cumulative anvil angle at normal fastening.

In addition, the feature amount used by generator 551 is a value calculated by the product of the cumulative anvil angle (that is, the cumulative anvil angle indicated by the arrows (1) in FIG. 5) and the average value of the anvil angle per strike (that is, the tilt of the double arrow (2) in FIG. 5). That is, the feature amount at anomalous fastening is a value greater than a value of the feature amount at normal fastening. It should be noted that estimator 392 may calculate the feature amount, or generator 551 may calculate the feature amount. When estimator 392 calculates the feature amount, data including the feature amount is generated as actual measured data.

[Operation of Management System]

Figure 6:
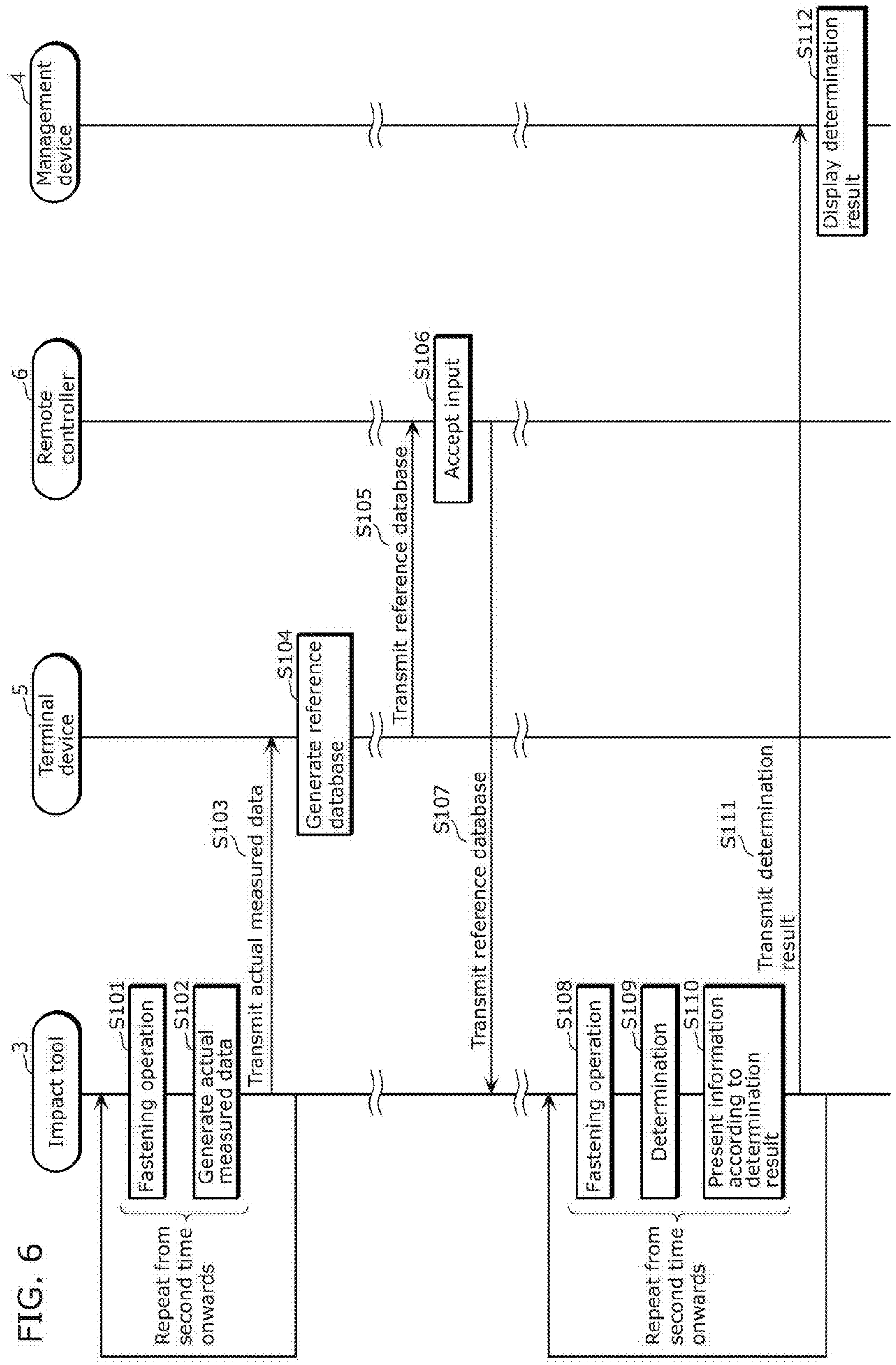
FIG. 6 is a sequence diagram showing the operation of the impact tool management system according to the embodiment.

FIG. 6 is a sequence diagram showing the operation of management system 2 for impact tool 3 according to the embodiment. It should be noted that step S101 to step S104 in FIG. 6 corresponds to the time of learning shown in (a) in FIG. 1, step S105 to step S107 corresponds to the time of setting shown in (b) in FIG. 1, and step S108 to step S112 corresponds to the time of operation shown in (c) in FIG. 1.

First, the operator uses impact tool 3 to perform the fastening (that is, the fastening operation) of the target part on target object 1 (step S101).

Estimator 392 of impact tool 3 generates actual measured data from the results measured by measurer 391 (step S102).

Transmitter 35 of impact tool 3 transmits the actual measured data generated by estimator 392 in step S102 to terminal device 5 (step S103). It should be noted that if step S101 is executed again after step S103, impact tool 3 executes step S102 to step S103.

Generator 551 of terminal device 5 generates a reference database based on the actual measured data transmitted in step S103 (step S104).

Transmitter 54 of terminal device 5 transmits the reference database generated by generator 551 in step S104 to remote controller 6 (step S105).

Input unit 62 of remote controller 6 accepts input from the operator (step S106).

Transmitter 64 of remote controller 6 transmits the reference database to impact tool 3 (that is, sets the threshold) (step S107).

After step S107, the operator uses impact tool 3 to perform the fastening (that is, the fastening operation) of the target part on target object 1 (step S108).

Determiner 393 of impact tool 3 determines from the threshold whether the fastening operation executed in step S108 is normal fastening or anomalous fastening (step S109).

Presenter 37 of impact tool 3 presents the operator with information in accordance with the determination result generated by determiner 393 based on the determination at step S109 (step S110). For example, presenter 37 presents the light according to the result of the determination to the operator.

Transmitter 35 of impact tool 3 transmits the determination result generated by determiner 393 based on the determination in step S109 to management device 4 (step S111). It should be noted that if step S108 is executed again after step S111, impact tool 3 executes step S109 to step S111.

Controller 44 of management device 4 displays the determination result transmitted in step S111 on display 42 (step S112).

It should be noted that in step S103, transmitter 35 may transmit the actual measured data each time the actual measured data is generated in step S102, or may transmit the actual measured data for multiple times at once. Similarly, in step S111, transmitter 35 may transmit the determination result each time the determination result based on the determination in step S109 is generated, or may transmit the determination results for multiple times at once.

In addition, when updating to the latest reference database, or when the target part for which impact tool 3 performs the fastening operation changes, the reference database set in impact tool 3 may be updated. For example, in order to update the reference database, the process may be executed again from step S101, or if the latest reference database or the reference database of the changed target part has already been generated, the process may be executed from step S105.

In addition, step S105 may be omitted. For example, in step S106, the operator may manually input the reference database into remote controller 6.

Figure 7:
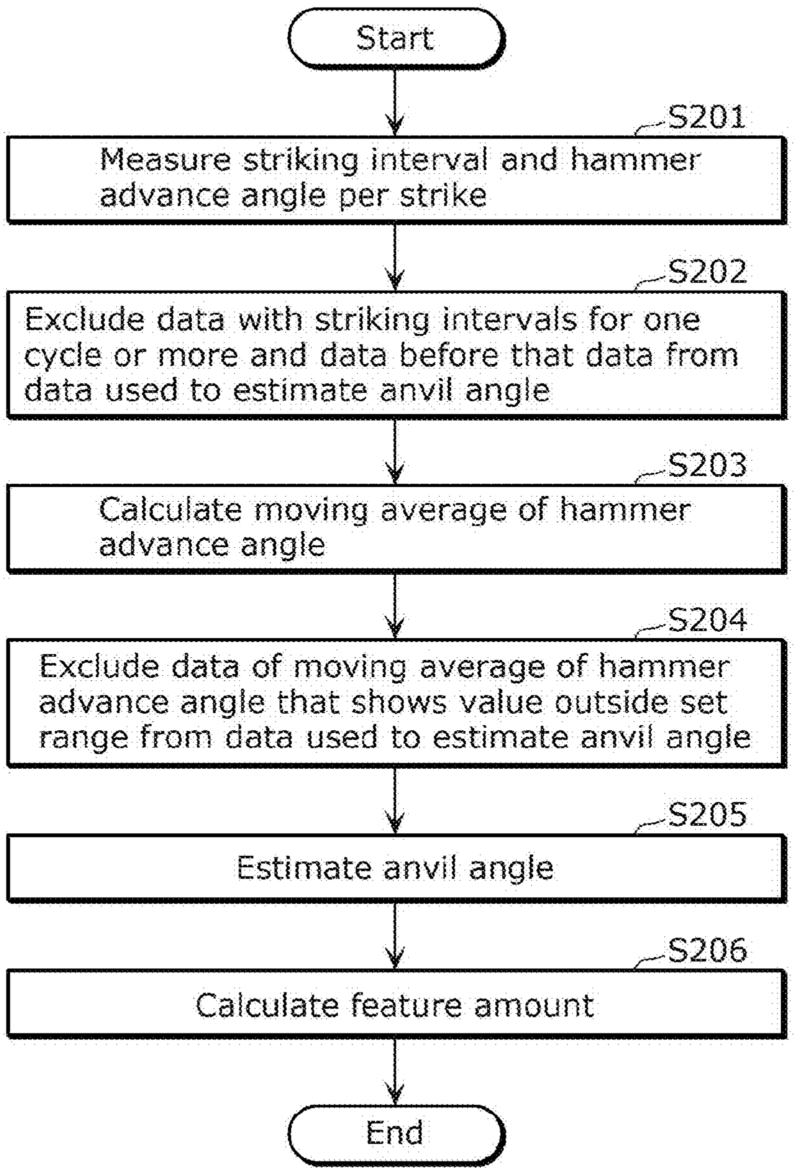
FIG. 7 is a flowchart showing detailed steps in step S102 shown in FIG. 6.

Next, details of step S102 in FIG. 6 will be described with reference to FIG. 7. FIG. 7 is a flowchart showing the detailed steps of step S102 shown in FIG. 6.

First, when impact tool 3 performs the fastening operation, measurer 391 measures the striking interval and the hammer advance angle per strike (step S201).

Estimator 392 excludes data having a striking interval of one or more cycles and data before the data from the data used to estimate the anvil angle (step S202). It should be noted that one cycle means the cycle in which the hammer rotates half a turn to strike the anvil.

Estimator 392 uses the data remaining in step S202 to calculate the moving average of the hammer advance angle (step S203).

Estimator 392 excludes data indicating a value outside the set range of the moving average data of the hammer advance angle calculated in step S203 from the data used to estimate the anvil angle (step S204).

Estimator 392 estimates the anvil angle using the data remaining in step S204 (step S205).

Using the anvil angle estimated in step S205, estimator 392 calculates the cumulative anvil angle and the average value of the anvil angle per strike as explained in FIG. 5, and calculates the feature amount (step S206).

A specific example of each step in FIG. 7 will be described with reference to FIG. 8A to FIG. 8D.

Figure 8A:
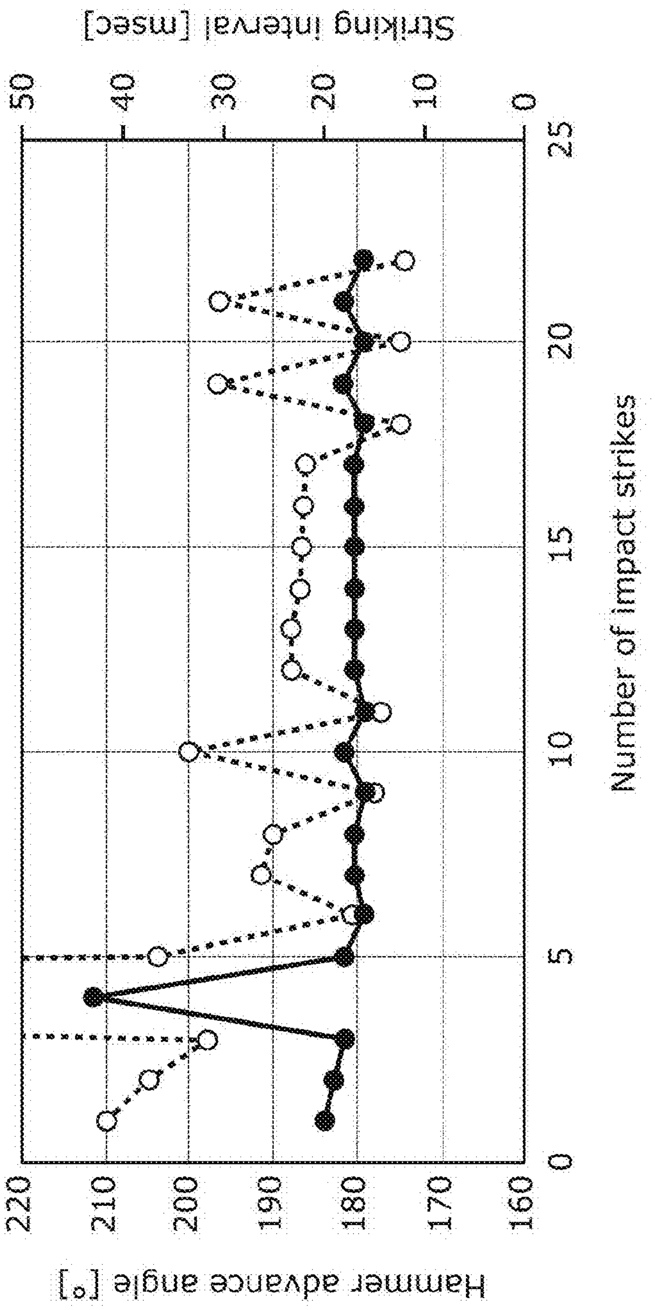
FIG. 8A is a graph showing data of the striking interval and hammer advance angle measured by the measurer in step S201 in FIG. 7.

FIG. 8A is a graph showing data of the striking interval and hammer advance angle measured by measurer 391 in step S201 in FIG. 7. It should be noted that in the graph shown in FIG. 8A, the horizontal axis represents the number of impact strikes, the first vertical axis located on the left is the hammer advance angle, and the second vertical axis located on the right is the striking interval. In addition, the solid line shown in FIG. 8A is a line showing the striking interval, the dashed line is a line showing the hammer advance angle, and the same applies to the diagrams after FIG. 8A.

As shown in FIG. 8A, measurer 391 measures the striking interval and the hammer advance angle for each impact. It should be noted that the hammer advance angle shown in FIG. 8A is the hammer advance angle per strike. In addition, when focusing on the striking interval, except for the fourth number of impact strikes, the striking interval is approximately 18 msec, and the striking interval is 40 msec or more when the fourth number of impact strikes. It should be noted that in FIG. 8A, the striking interval for one cycle is about 18 msec, and the striking interval for the fourth number of impact strikes is the striking interval for about two cycles. That is, it means that from the time the hammer strikes the anvil for the third time to the time it strikes the anvil for the fourth time, in the first cycle, the hammer's claws did not catch the anvil's claws, and in the second cycle, the hammer's claws caught by the anvil's claws and struck them.

Figure 8B:
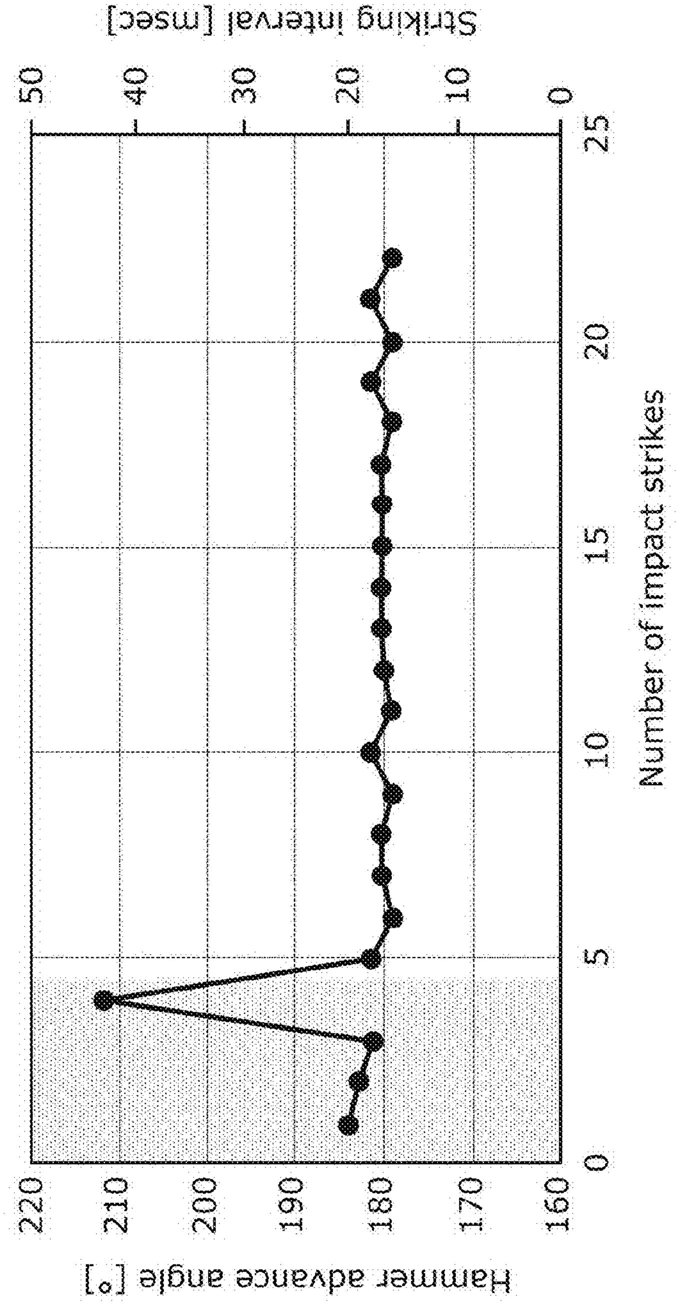
FIG. 8B is a graph showing data of the striking intervals that remained not excluded in step S202 in FIG. 7.

FIG. 8B is a graph showing data of striking intervals that remained not excluded in step S202 in FIG. 7. It should be noted that in FIG. 8B, estimator 392 executes step S202 in FIG. 7 using the data of the striking interval shown in FIG. 8A.

As shown in FIG. 8B, estimator 392 excludes data having a striking interval of one or more cycles from the striking interval data shown in FIG. 8A and data before the data (in FIG. 8B, data with up to the fourth number of impact strikes) from the data used to estimate the anvil angle.

Figure 8C:
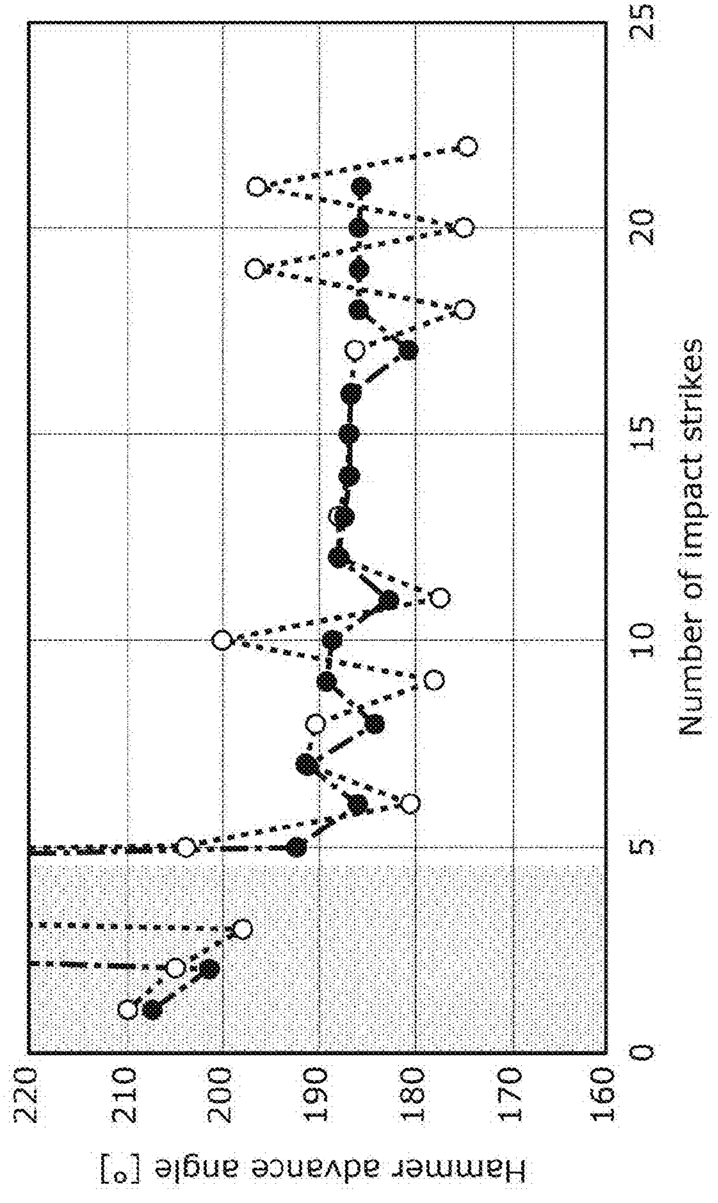
FIG. 8C is a graph showing moving average data of the hammer advance angles calculated by the estimator in step S203 in FIG. 7.

FIG. 8C is a graph showing moving average data of the hammer advance angle calculated by estimator 392 in step S203 in FIG. 7. It should be noted that in FIG. 8C, estimator 392 executes step S203 in FIG. 7 using data of the hammer advance angle corresponding to the data of the striking interval shown in FIG. 8B. In addition, the dash-dotted line shown in FIG. 8C is a line indicating the moving average of the hammer advance angle, and the same applies to the diagrams after FIG. 8C.

As shown in FIG. 8C, estimator 392 calculates the moving average of the hammer advance angle using data of the hammer advance angle (in FIG. 8C, data after the fifth impact strike) corresponding to the data of the striking interval shown in FIG. 8B (that is, data of the striking interval that was not excluded in the explanation in FIG. 8B).

Figure 8D:
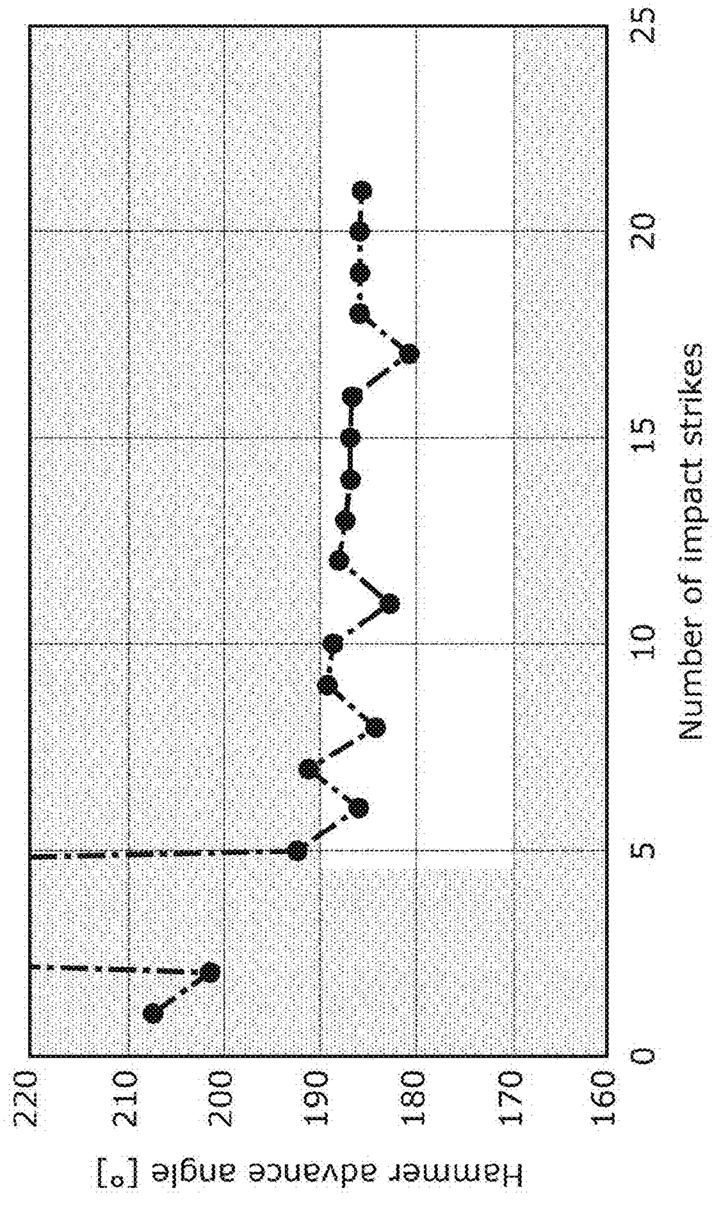
FIG. 8D is a graph showing moving average data of the hammer advance angles that remained not excluded in step S204 in FIG. 7.

FIG. 8D is a graph showing moving average data of the hammer advance angles that remained not excluded in step S204 in FIG. 7. It should be noted that in FIG. 8D, estimator 392 executes step S204 in FIG. 7 using the moving average data of the hammer advance angle shown in FIG. 8C. In addition, in FIG. 8D, the setting range is described as 170° to 190°.

As shown in FIG. 8D, estimator 392 excludes data indicating values outside the set range of the moving average data of the hammer advance angle shown in FIG. 8C (in FIG. 8D, data with the fifth and seventh number of impact strikes) from the data used to estimate the anvil angle. It should be noted that estimator 392 uses the moving average data of the hammer advance angle remaining in FIG. 8D to estimate the anvil angle (step S205 in FIG. 7) and calculates the feature amount (step S206 in FIG. 7).

In addition, a specific example of step S104 in FIG. 6 will be described with reference to FIG. 9.

Figure 9:
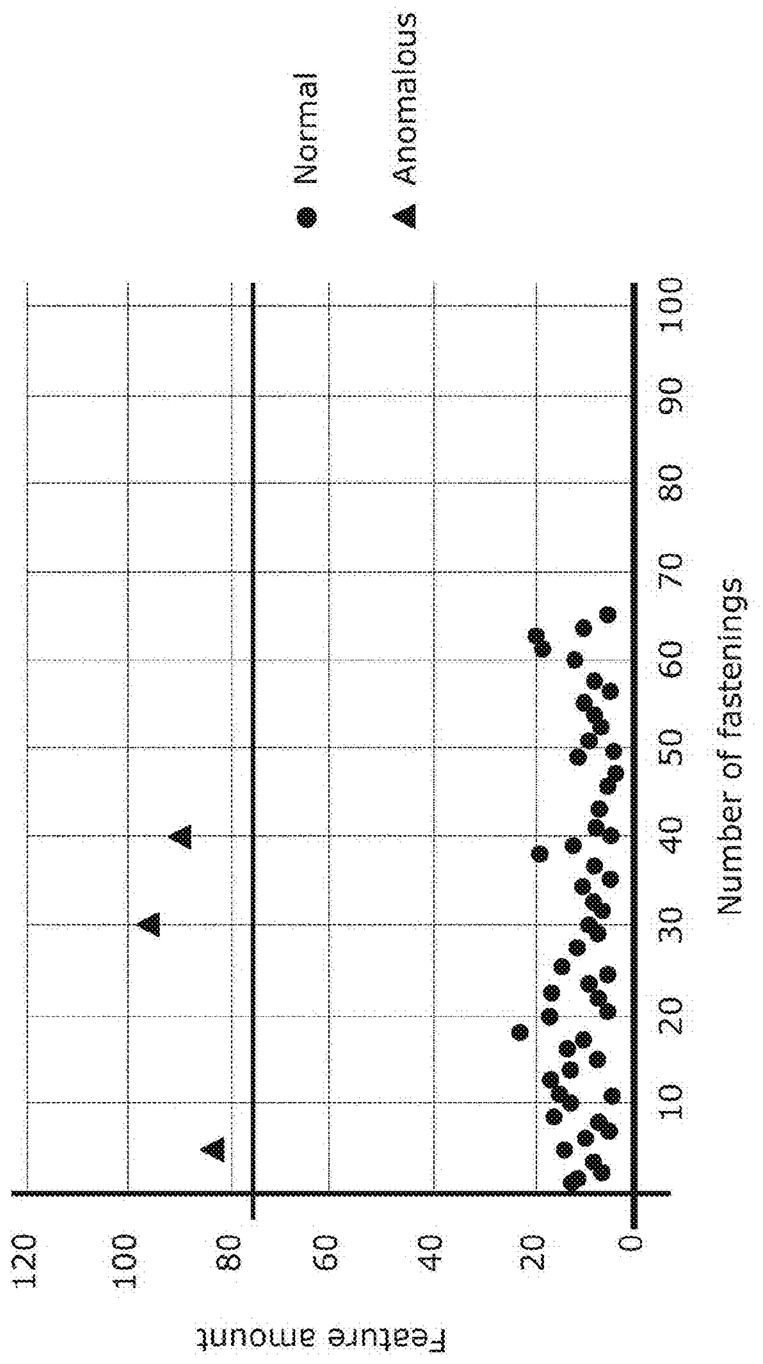
FIG. 9 is a graph showing feature amounts calculated by the estimator using the anvil angle estimated from moving average data of the hammer advance angles shown in FIG. 8D.

FIG. 9 is a graph showing feature amounts calculated using anvil angle estimated by estimator 392 from moving average data of the hammer advance angle shown in FIG. 8D (that is, data of striking intervals not excluded in the explanation in FIG. 8D). It should be noted that the graph shown in FIG. 9 is an example of an image displayed on display 52 of terminal device 5.

In the graph shown in FIG. 9, the horizontal axis represents the number of fastenings, and the vertical axis represents the feature amount calculated by estimator 392. The number of fastenings means the number of times impact tool 3 has performed the fastening of one target part.

In addition, normal circle marks and anomalous triangle marks are results of determination based on the threshold generated by generator 551 of terminal device 5. In FIG. 9, generator 551 generates a threshold where the feature amount is about 75. Generator 551 generates the graph shown in FIG. 9, in which feature amounts below the threshold are normal, and feature amounts above the threshold are anomalous. In addition, generator 551 generates a reference database having the generated threshold.

It should be noted that the threshold shown in FIG. 9 may be changed to an arbitrary value by, for example, an operator or the like.

In addition, since terminal device 5 stores and manages the generated reference database, for example, when impact tool 3 is replaced due to a failure, the operator can set the reference database stored by terminal device 5 as new impact tool 3.

Figure 10:
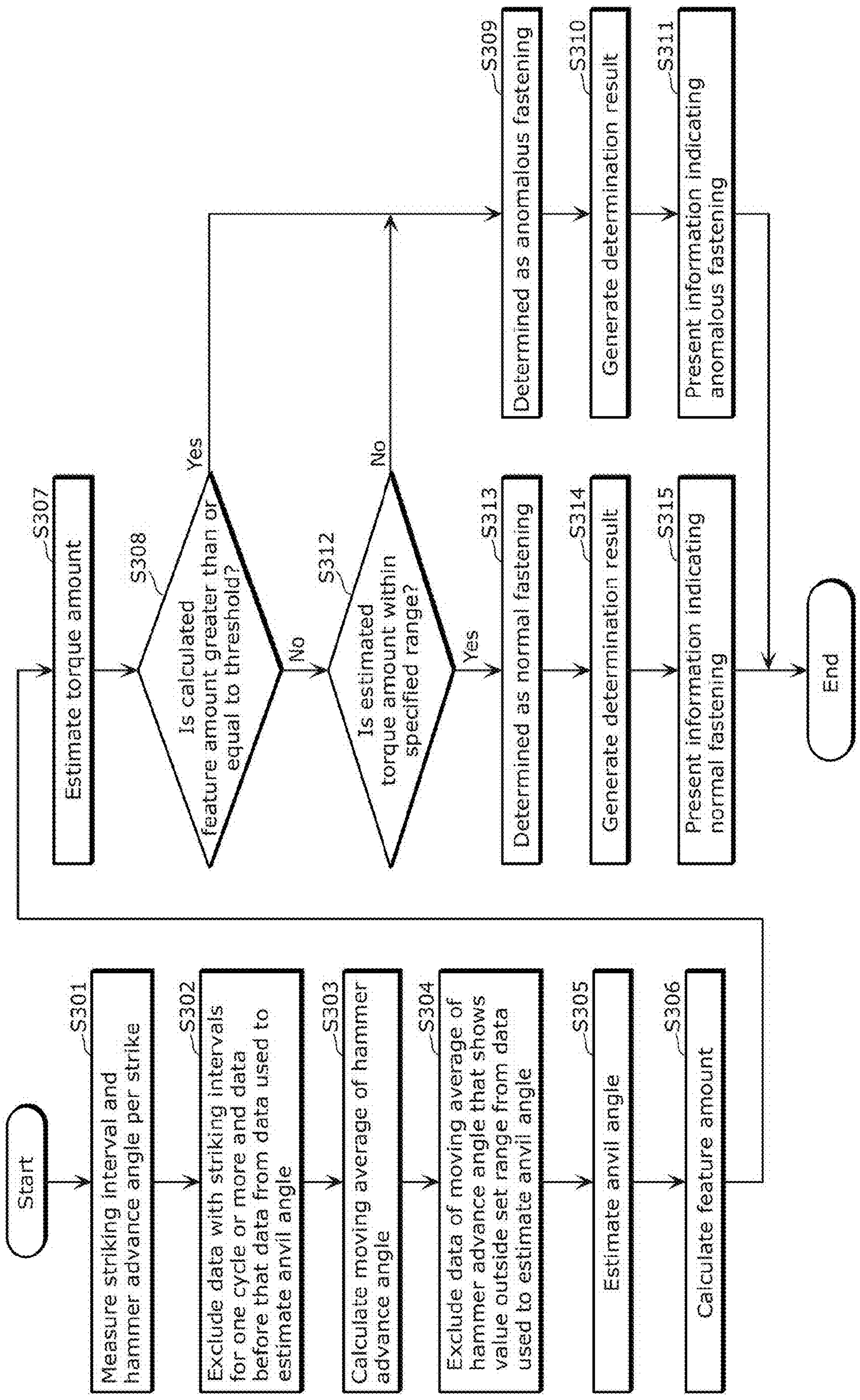
FIG. 10 is a flowchart showing detailed steps in step S109 shown in FIG. 6.

In addition, details of step S109 in FIG. 6 will be explained with reference to FIG. 10. FIG. 10 is a flowchart showing detailed steps in step S109 shown in FIG. 6. It should be noted that step S301 to step S306 shown in FIG.

10 are the same as step S201 to step S206 shown in FIG. 7, respectively, and therefore their description will be omitted.

Estimator 392 estimates the torque amount applied to the target part based on the striking interval and the hammer advance angle per strike measured in step S301 (step S307).

Determiner 393 determines whether the feature amount calculated in step S306 by estimator 392 is greater than or equal to the threshold (step S308).

If it is determined that the feature amount is greater than or equal to the threshold (Yes in step S308), determiner 393 determines that that fastening operation is anomalously fastened (step S309).

Determiner 393 generates a determination result based on the determination in step S309 (step S310).

Based on the determination in step S309, presenter 37 presents information indicating anomalous fastening to the operator (step S311). For example, presenter 37 presents information indicating anomalous fastening to the operator by lighting up a red light.

If it is determined that the feature amount is less than the threshold (No in step S308), determiner 393 determines whether the torque amount estimated by estimator 392 in step S307 is a torque amount within the specified range (step S312).

If it is determined that the estimated torque amount is not within the specified range (No in step S312), determiner 393 determines that the fastening operation is anomalous fastening (step S309).

If it is determined that the estimated torque amount is within the specified range (Yes in step S312), determiner 393 determines that the fastening operation is normal fastening (step S313).

Determiner 393 generates a determination result based on the determination in step S313 (step S314).

Based on the determination in step S313, presenter 37 presents information indicating normal fastening to the operator (step S315). For example, presenter 37 presents information indicating normal fastening to the operator by lighting up a green light.

It should be noted that step S307 may be executed at any time after step S301 and before step S308.

In addition, step S310 may be executed after step S311 or may be executed simultaneously with step S311. In addition, step S314 may be executed after step S315 or may be executed simultaneously with step S315.

In addition, after the determination of Yes in step S308, the determination of step S312 may be made additionally. In this case, determiner 393 determines that the fastening is anomalous, regardless of the determination result in step S312, but it is possible to provide variations in the information presented in step S311 by presenter 37. For example, if determiner 393 determines that anomalous fastening is applied in both of the determinations (that is, if the determination is made Yes in step S308 and the determination is made No in step S312), presenter 37 lights up a red light. On the other hand, if determiner 393 determines that the fastening is normal in one of the determinations, and that the fastening is anomalous in the other of the determinations (that is, if the determination is made No in step S308, and the determination is made No in step S312, or if the determination is made Yes in step S308, and the determination is made Yes in step S312), presenter 37 lights up an orange light. This allows the operator to obtain more detailed information in real time.

FIG. 11 is a diagram showing an example of the determination result displayed in step S112 shown in FIG. 6. It should be noted that the table shown in FIG. 11 is an example of an image displayed on display 42 of management device 4.

As shown in FIG. 11, the determination results (in other words, construction results) include tool used, calibration date of the tool used, operator name, operation time, set torque, specified torque range, fastening torque, feature amount, threshold, and fastening state, but may include information indicating fastening of the target part other than these.

The identification number of impact tool 3 is displayed in the column for the tool used.

The date on which impact tool 3 was calibrated is displayed in the column for the calibration date.

Information indicating the operator who has performed the fastening operation is displayed in the column for the operator name, and for example, the name of the operator, or the identification number assigned to each operator may be displayed.

The work time column displays the time when the fastening operation was started is displayed in the column for the operation time.

The torque amount required for a predetermined fastening for the target object is displayed in the column for the set torque.

The range of torque amount used when determiner 393 determines whether the torque amount is within the specified range is displayed in the specified torque range.

The torque amount applied to the target part estimated by estimator 392 is displayed in the column for the fastening torque.

The feature amount calculated by estimator 392 is displayed in the column for the feature amount.

The threshold used by determiner 393 for determining the feature amount is displayed in the column for the threshold.

The fastening state determined by determiner 393 is displayed in the column for the fastening state.

For example, looking at the row with the operation time is 11:00, since the fastening state is normal, it can be seen that the fastening of the target part has been accurately performed. More specifically, since the fastening torque is 5.0, and is within the specified torque range (4.8 to 5.2), it can be seen that the operation of fastener 36 has stopped after the fastening torque reached the set torque. In addition, since the feature amount is 18 and is below the threshold (75), it can be seen that the target part has been fastened in the correct direction. That is, it can be seen that the target part is in a fastening state as shown in (a) in FIG. 2.

In addition, looking at the row with the operation time is 11:05, since the fastening state is anomalous, the fastening of the target part has not been accurately performed. More specifically, since the fastening torque is 3.5, and is outside the specified torque range (4.8 to 5.2), it can be seen that the operation of fastener 36 has stopped before the fastening torque reaches the set torque. In addition, since the feature amount is 20 and is below the threshold (75), it can be seen that the target part has been fastened in the correct direction. That is, it can be seen that the target part is in a fastening state as shown in (b) in FIG. 2.

In addition, looking at the row with the operating time at 11:13, since the fastening state is anomalous, it can be seen that the fastening of the target part has not been accurately performed. More specifically, since the fastening torque is 5.0, and is within the specified torque range (4.8 to 5.2), it can be seen that the operation of fastener 36 has stopped after the fastening torque reached the set torque. In addition, since the feature amount is 85 and is above the threshold (75), it can be seen that the target part has been fastened in an incorrect direction. That is, it can be seen that the target part is in a cross-threaded fastening state as shown in (c) in FIG. 2.

It should be noted that the operator or the like may customize the data so that only part of the data of the determination result shown in FIG. 11 is displayed. For example, management device 4 may display data excluding the tool used.

[Effects, Etc.]

Aspects of the invention obtained from the disclosure of this specification will be exemplified below, and the effects and the like obtained from the aspects will be explained.

Aspect 1 is impact tool 3 including: measurer 391 that measures a hammer advance angle per strike for a target part; determiner 393 that uses a predetermined reference database including a threshold to determine whether the hammer advance angle measured by measurer 391 is an angle corresponding to normal fastening or an angle corresponding to anomalous fastening based on the threshold; and presenter 37 that presents information indicating anomalous fastening when determiner 393 determines that anomalous fastening has been applied.

Since such impact tool 3 determines whether the hammer advance angle indicates normal fastening or anomalous fastening from the threshold, it can more accurately determine the fastening state of the target part compared to the conventional technology, which simply determines the fastening state based on actual measured feature amounts at the time of completion of fastening. This allows impact tool 3 to improve the accuracy of determining the fastening state of the target part.

Aspect 2 is impact tool 3 according to Aspect 1 including: estimator 392 that estimates an anvil angle using the hammer advance angle per strike measured by measurer 391.

Since impact tool 3 estimates the anvil angle by using the hammer advance angle per strike, the rotation angle of the tip tool (for example, a socket) can be estimated. This allows impact tool 3 to more accurately determine the fastening state of the target part.

Aspect 3 is impact tool 3 according to Aspect 1 or 2, wherein the reference database is a database generated from actual measured data that is obtained from previously performed measurement by using a hammer advance angle per strike of impact tool 3 when normal fastening is applied to the target part or a part corresponding to the target part, and a hammer advance angle per strike of impact tool 3 when anomalous fastening is applied.

Since such impact tool 3 determines whether the fastening is normal or anomalous by using a reference database generated from actual measured data that has been performed in advance, it is possible to more accurately determine the fastening state of the target part.

Aspect 4 is impact tool 3 according to any one of Aspects 1 to 3, wherein the predetermined reference database is updatable.

Since the reference database can be updated in such impact tool 3, it can accommodate various changes in situations such as, for example, updating to the latest reference database, updating the reference database due to changes in the target part, or the like.

Aspect 5 is impact tool 3 according to any one of Aspects 1 to 4, wherein the threshold is variable.

Since the threshold used by determiner 393 for such impact tool 3 is variable, for example, the operator can make adjustments tailored to each impact tool 3 or to each process in which the fastening operation is performed. This allows impact tool 3 to be determined according to the orientation of the operator and the like.

Aspect 6 is impact tool 3 according to any one of Aspects 1 to 5, including: transmitter 35 that transmits a determination result by determiner 393 to an external device.

Since such impact tool 3 transmits the determination result to the external device, the operator and the like can confirm the determination result even after the fastening operation is completed.

Aspect 7 is impact tool 3 according to any one of Aspects 1 to 6, including: receiver 34 that receives a setting of the threshold from an external device.

Since such impact tool 3 determines whether the fastening is normal or anomalous by using a threshold received from the external device, the fastening state of the target part can be determined more accurately.

Aspect 8 is impact tool 3 management system 2 including: impact tool 3 according to any one of Aspects 1 to 7; and management device 4 that manages information indicating about a determination by determiner 393 included in impact tool 3.

Since such management system 2 manages information indicating the determining (that is, the determination result) by determiner 393, the determination result can be stored.

Aspect 9 is impact tool 3 management method including: measuring (S301) a hammer advance angle per strike for a target part; determining (S308), by using a predetermined reference database including a threshold, whether the hammer advance angle measured by the measuring (S301) is an angle corresponding to normal fastening or an angle corresponding to anomalous fastening based on the threshold; and presenting (S311) information indicating anomalous fastening when it is determined in the determining (S308) that anomalous fastening has been applied.

Since such a management method determines whether the hammer advance angle indicates normal or anomalous fastening from the that threshold value, the fastening state of the target part can be determined more accurately. Accordingly, the management method can improve the determination accuracy related to the fastening state of the target part.

Aspect 10 is a program for causing a computer to execute impact tool 3 management method according to Aspect 9.

According to such a program, the computer can improve the accuracy of determining the fastening state of the target part.

Other Embodiments

Although an embodiment has been described above, the present disclosure is not limited to the above-described embodiment.

For example, the communication method between the devices in the above-described embodiment is not particularly limited. In addition, in communication between devices, relay devices (such as broadband routers) not shown may be intervened.

In addition, presenter 37 is not limited to LEDs and the like, and may be realized, for example, by a liquid crystal display, organic electro luminescence (EL), or the like. In addition, instead of or in addition to presenting the determination result with visual display such as light or image, presenter 37 may present the determination result with sound. For example, presenter 37 may be realized by an outputter such as a speaker or a buzzer that outputs sound. The output sound may be an electronic sound or a synthetic sound. It should be noted that it is preferred that controller 39 generates different sounds from the outputter between when determiner 393 determines that the fastening is normal and when the fastening is anomalous.

In addition, although an example has been described in which impact tool 3 determines the fastening state of the target part using the reference database stored in storage 38, for example, each time the fastening operation in step S108 is performed, the reference database may be received from terminal device 5 or remote controller 6 to perform the determination.

In addition, in the above-described embodiment, another processor may execute the processing executed by a specific processor. In addition, the order of the multiple processes may be changed, or the multiple processes may be executed in parallel.

In addition, in the above-described embodiment, each component may be realized by executing a software program suitable for each component. Each component may be realized by a program executor such as a CPU or a processor, reading out and executing software programs recorded on a recording medium such as a hard disk or a semiconductor memory.

In addition, each component may be realized by hardware. For example, each component may be a circuit (or an integrated circuit). These circuits may be one circuit as a whole, or each of them may be a separate circuit. In addition, each of these circuits may be a general-purpose circuit or a dedicated circuit.

In addition, general or specific aspects of the present invention may be realized by a system, a device, a method, an integrated circuit, a computer program or a recording medium such as a computer-readable CD-ROM. In addition, it may also be realized by any combination of systems, devices, methods, integrated circuits, computer programs and recording media.

For example, in one aspect, the present invention may be realized as a method executed by a computer system such as a construction management system, or as a program for causing the computer system to execute the method. In another aspect, the present invention may be realized as a non-transitory computer-readable recording medium having such a program recorded thereon.

In addition, forms obtained by applying various modifications to each embodiment conceived by a person skilled in the art or forms realized by arbitrarily combining the components and functions in each embodiment without departing from the spirit of the present disclosure are also included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An impact tool comprising:

a measurer that measures a hammer advance angle per strike for a target part;

a determiner that uses a predetermined reference database including a threshold to determine whether the hammer advance angle measured by the measurer is an angle corresponding to normal fastening or an angle corresponding to anomalous fastening based on the threshold;

a presenter that presents information indicating anomalous fastening when the determiner determines that the hammer advance angle measured by the measurer is an angle corresponding to anomalous fastening; and an estimator that estimates an anvil angle using the hammer advance angle per strike measured by the measurer, wherein:

the estimator (i) calculates, using the anvil angle estimated, an anvil angle per strike and a cumulative anvil angle that is a cumulative value of the anvil angle, and (ii) calculates a feature amount that is a value obtained by multiplying the anvil angle per strike by the cumulative anvil angle calculated, when the feature amount calculated by the estimator is less than the threshold, the determiner determines that the hammer advance angle measured by the measurer is an angle corresponding to normal fastening, and when the feature amount calculated by the estimator is greater than or equal to the threshold, the determiner determines that the hammer advance angle measured by the measurer is an angle corresponding to anomalous fastening.

2. The impact tool according to claim 1, wherein the predetermined reference database is a database generated from actual measured data that is obtained from previously performed measurement by using a hammer advance angle per strike of the impact tool when normal fastening is applied to the target part or a part corresponding to the target part, and a hammer advance angle per strike of the impact tool when anomalous fastening is applied.

3. The impact tool according to claim 1, wherein the predetermined reference database is updatable.

4. The impact tool according to claim 1, wherein the threshold is variable.

5. The impact tool according to claim 1, comprising:

a transmitter that transmits a determination result by the determiner to an external device.

6. The impact tool according to claim 1, comprising:

a receiver that receives a setting of the threshold from an external device.

7. An impact tool management system comprising:

the impact tool according to claim 1; and a management device that manages information indicating about a determination by the determiner included in the impact tool.

8. An impact tool management method comprising:

measuring a hammer advance angle per strike for a target part;

determining, by using a predetermined reference database including a threshold, whether the hammer advance angle measured by the measuring is an angle corresponding to normal fastening or an angle corresponding to anomalous fastening based on the threshold;

presenting information indicating anomalous fastening when it is determined in the determining that hammer advance angle measured by the measurer is an angle corresponding to anomalous fastening; and estimating an anvil angle using the hammer advance angle per strike measured by the measurer, wherein:

the estimating comprises (i) calculating, using the anvil angle estimated, an anvil angle per strike and a cumulative anvil angle that is a cumulative value of the anvil angle, and (ii) calculating a feature amount that is a value obtained by multiplying the anvil angle per strike by the cumulative anvil angle calculated, when the feature amount calculated in the estimating is less than the threshold, it is determined that the hammer advance angle measured in the measuring is an angle corresponding to normal fastening, and when the feature amount calculated in the estimating is greater than or equal to the threshold, it is determined that the hammer advance angle measured in the measuring is an angle corresponding to anomalous fastening.

9. A non-transitory computer-readable recording medium having recorded thereon a program for causing a computer to execute the impact tool management method according to claim 8.

* * * * *